(12) United States Patent
Damenti et al.

(10) Patent No.: US 9,980,212 B1
(45) Date of Patent: May 22, 2018

(54) EFFICIENT SEARCHING FOR COMMUNICATIONS NETWORKS

(71) Applicant: CSC Holdings, LLC, Bethpage, NY (US)

(72) Inventors: Nicholas Damenti, Setauket, NY (US); Christopher Zydel, Dix Hills, NY (US)

(73) Assignee: CSC Holdings, LLC, Bethpage, NY (US)

( * ) Notice: Subject to any disclaimer, the term of this patent is extended or adjusted under 35 U.S.C. 154(b) by 0 days. days.

(21) Appl. No.: 15/695,430

(22) Filed: Sep. 5, 2017

Related U.S. Application Data

(63) Continuation of application No. 15/496,758, filed on Apr. 25, 2017, now Pat. No. 9,794,869, which is a continuation of application No. 15/285,961, filed on Oct. 5, 2016, now Pat. No. 9,661,563, which is a continuation of application No. 13/183,974, filed on Jul. 15, 2011, now Pat. No. 9,491,690.

(60) Provisional application No. 61/364,674, filed on Jul. 15, 2010, provisional application No. 61/364,733, filed on Jul. 15, 2010.

(51) Int. Cl.
*H04W 4/00* (2009.01)
*H04W 48/16* (2009.01)

(52) U.S. Cl.
CPC .................. *H04W 48/16* (2013.01)

(58) Field of Classification Search
CPC .................................................. H04W 48/16
USPC .......................................... 455/434; 370/338
See application file for complete search history.

(56) References Cited

U.S. PATENT DOCUMENTS

| | | |
|---|---|---|
| 6,246,870 B1 | 6/2001 | Dent et al. |
| 7,768,939 B1 | 8/2010 | Trivedi et al. |
| 7,965,637 B1 | 6/2011 | Trivedi et al. |
| 8,611,333 B2 | 12/2013 | Ji et al. |
| 8,635,499 B2 | 1/2014 | Cohn et al. |
| 8,660,571 B2 | 2/2014 | Hulkkonen et al. |
| 8,780,859 B2 | 7/2014 | Damenti |
| 9,032,083 B2 | 5/2015 | Scherer et al. |
| 9,036,582 B2 | 5/2015 | Scherer et al. |
| 9,420,505 B1 | 8/2016 | Damenti |
| 9,491,690 B2 | 11/2016 | Damenti et al. |
| 9,661,563 B1 | 5/2017 | Damenti et al. |
| 2005/0191987 A1* | 9/2005 | Zhao ............... H04W 52/0241 455/401 |
| 2006/0166699 A1 | 7/2006 | Aghvami et al. |

(Continued)

FOREIGN PATENT DOCUMENTS

WO    WO 2011/023231 A1    3/2011

OTHER PUBLICATIONS

U.S. Appl. No. 15/212,608, filed Jul. 18, 2016, entitled "Efficient Use of a Communications Network".

(Continued)

*Primary Examiner* — Marcos Batista
(74) *Attorney, Agent, or Firm* — Sterne, Kessler, Goldstein & Fox P.L.L.C.

(57) ABSTRACT

Systems and methods are provided for adaptive control of scanning by a communications device, such as a mobile handset, for an available communication network based on a status of the communications device, user behavior, and signal status. A new time interval used for scanning for communications networks and access points is calculated responsive to a detected change in condition.

20 Claims, 4 Drawing Sheets

(56) References Cited

U.S. PATENT DOCUMENTS

| | | |
|---|---|---|
| 2006/0269028 A1 | 11/2006 | Bley et al. |
| 2006/0281436 A1 | 12/2006 | Kim et al. |
| 2007/0082671 A1 | 4/2007 | Feng et al. |
| 2008/0014941 A1 | 1/2008 | Catovic et al. |
| 2008/0016525 A1 | 1/2008 | Cai et al. |
| 2009/0197604 A1 | 8/2009 | Gupta et al. |
| 2009/0310560 A1 | 12/2009 | Gandham et al. |
| 2010/0020769 A1 | 1/2010 | Ma et al. |
| 2010/0081428 A1 | 4/2010 | Maejima et al. |
| 2010/0234021 A1 | 9/2010 | Ngai et al. |
| 2010/0304794 A1 | 12/2010 | Beninghaus et al. |
| 2011/0211511 A1* | 9/2011 | Bakthavathsalu ................. H04W 52/0254 370/311 |
| 2012/0020325 A1 | 1/2012 | Swamy et al. |
| 2012/0184276 A1 | 7/2012 | Pichna et al. |

OTHER PUBLICATIONS

U.S. Appl. No. 15/496,758, filed Apr. 25, 2017, entitled "Efficient Searching for Communications Networks".

* cited by examiner

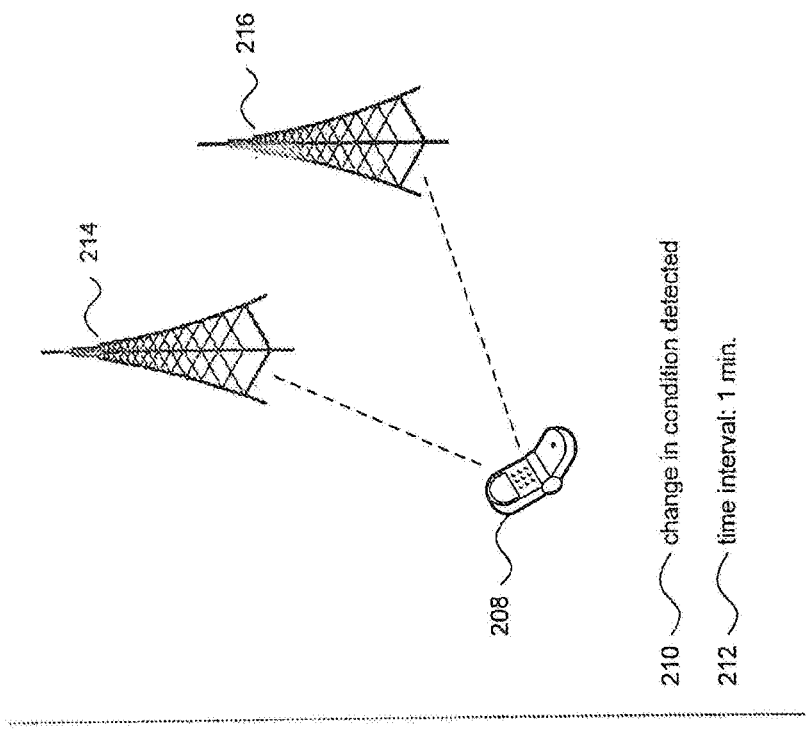
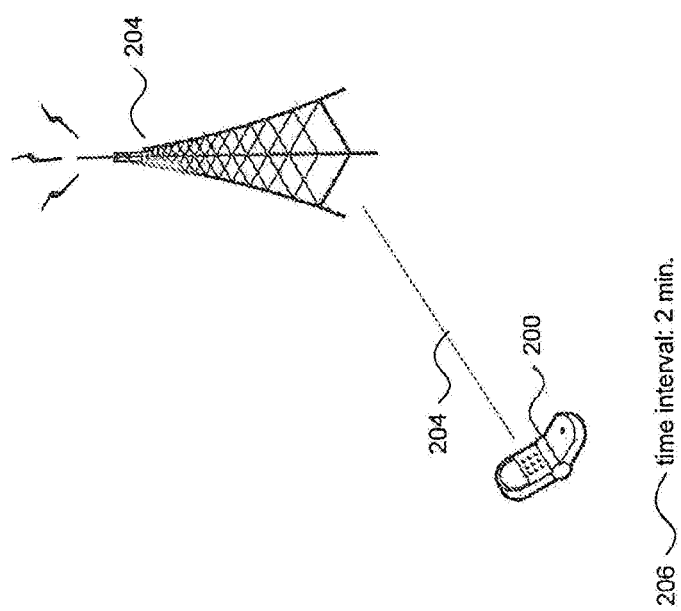

| Condition Detected | User Behavior | Communication Device Status | Signal Status | Time Interval |
|---|---|---|---|---|
|  | not in use | standby mode; high battery | strong | 2 minutes |
| switch to active mode | in use | active mode; high battery | strong | 1 minute |
| communications device no longer in use | not in use | active mode; high battery | strong | 1 minute |
| weak signal | not in use | active mode; high battery | weak | 0.5 minute |
| low battery | not in use | active mode; low battery | weak | 5 minutes |

FIG. 4

EFFICIENT SEARCHING FOR COMMUNICATIONS NETWORKS

CROSS REFERENCE TO RELATED APPLICATIONS

This application is a continuation of U.S. patent application Ser. No. 15/496,758, filed on Apr. 25, 2017, now U.S. Pat. No. 9,794,869, which is a continuation of U.S. patent application Ser. No. 15/285,961, filed on Oct. 5, 2016; now U.S. Pat. No. 9,661,563, which is a continuation of U.S. patent application Ser. No. 13/183,974, filed on Jul. 15, 2011, now U.S. Pat. No. 9,491,690, which claims the benefit of U.S. Provisional Application No. 61/364,674, filed on Jul. 15, 2010, and U.S. Provisional Application No. 61/364,733, filed on Jul. 15, 2010, all of which are incorporated herein by reference in their entirety.

FIELD OF THE INVENTION

This application relates generally to telecommunications and more specifically to searching for telecommunications networks.

BACKGROUND

As of the time of preparation of this patent document, most mobile telephone handsets have the ability to communicate using mobile communications standards. These mobile communications standards include the Global System for Mobile (GSM) communications standard, CDMA2000 (also known as IMT Multi-Carrier (IMT-MC)), LTE (Long Term Evolution), WiMax (Worldwide Interoperability for Microwave Access), etc. Several mobile network operators have infrastructure in place around the world supporting communication using these mobile standards, forming a worldwide mobile communications network. Some mobile network operators obtain licenses from a government. For example, GSM network operators acquire one or more radio spectrum licenses from a government agency setting forth a GSM frequency range in which they are permitted to operate.

When a mobile handset subscriber ventures outside of his or her network operator's coverage area, or if the subscriber's network coverage is interrupted for any reason, the mobile handset can switch to a roaming status so that it can utilize the infrastructure of another mobile network operator. If the subscriber's network operator has an agreement with another network operator that has network coverage for the area including the roaming mobile handset, the mobile handset can then initiate a handover to the visited communications network. Sometimes a handover occurs between a GSM network and a non-GSM network, such as, for example, a WiFi network (e.g., based on the IEEE 802.1 standard). Thus, a user talking on a mobile handset that is both WiFi and GSM capable may have a call handed over between the WiFi and GSM networks.

Currently, mobile handsets typically scan for available networks and/or network access points at static intervals. For example, a mobile handset may scan for networks and network access points once every minute. Scanning for networks and network access points more frequently allows a mobile handset access to more up to date information regarding available networks and network access points but uses more battery power and bandwidth. On the other hand, scanning less frequently may cause a mobile handset to remain unconnected to a network for a longer period of time before detecting an available network. Additionally, current scanning systems fail to take into account changing conditions that may make scanning more or less frequently advisable or inadvisable. What is needed, therefore, are methods, systems, and computer program products to enable a communications device, such as a mobile handset, to adaptively scan for communications networks or communications network access points.

SUMMARY

This section is for the purpose of summarizing some aspects of the present invention and to briefly introduce some embodiments. Simplifications or omissions may be made to avoid obscuring the purpose of the section. Such simplifications or omissions are not intended to limit the scope of the present invention.

In an embodiment, a communications device detects a change in condition, calculates a time interval responsive to the change in condition, and scans for a communications network at a periodic frequency determined by the time interval.

In another embodiment, data is received from a communications device including a change in condition detected at the communications device and a time interval determining a periodic frequency used by the communications device to scan for a communications network responsive to the change in condition is calculated. A message including the time interval is then sent to the communications device.

Further features and advantages of the invention, as well as the structure and operation of various embodiments of the present invention, are described in detail below with reference to the accompanying drawings. The invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

FIGS. 2A and 2B depict an embodiment of determining a time interval based on a detected change in condition.

FIG. 4 depicts a series of time interval changes responsive to a series of detected conditions in accordance with an embodiment of the present invention.

Figure 1:
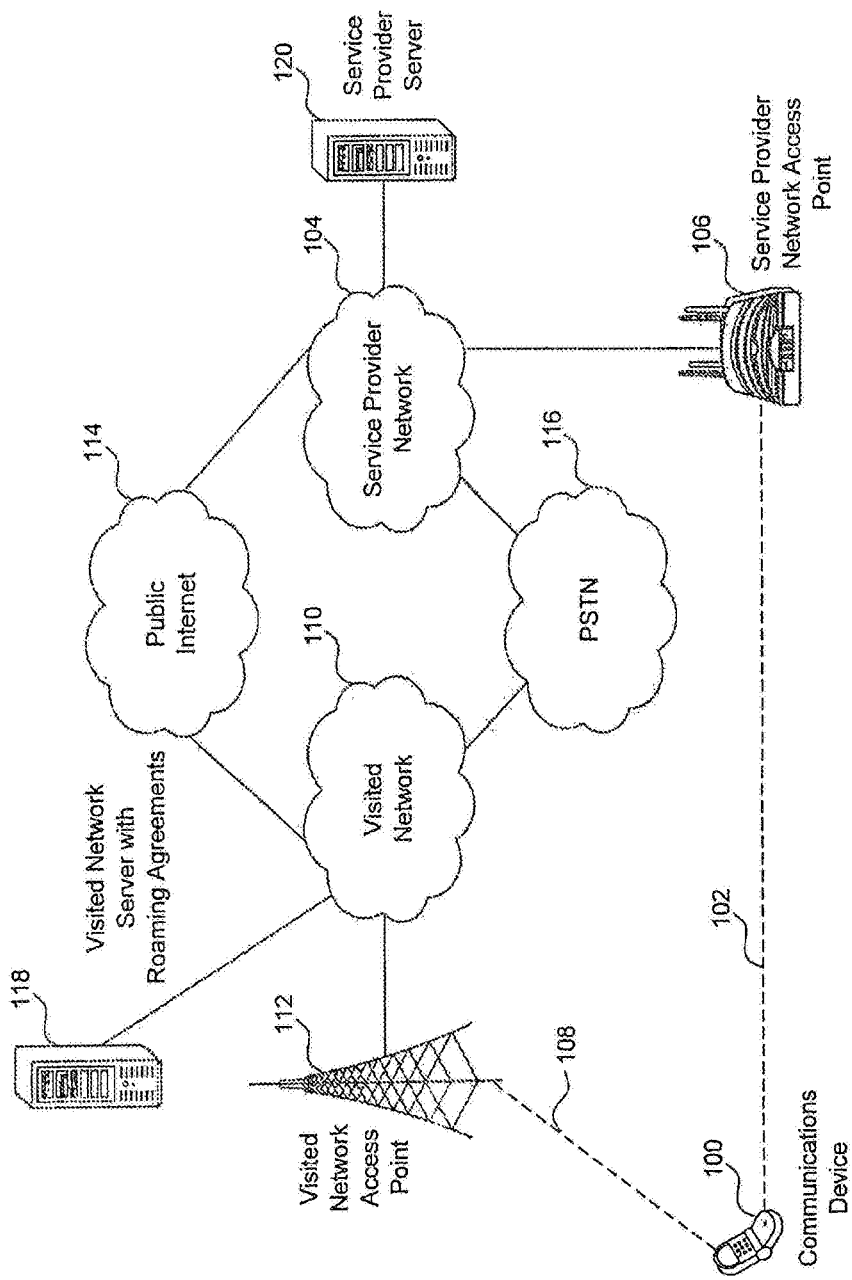
FIG. 1 illustrates network structure and communications according to an embodiment of the present invention.

Features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

In the following description, numerous specific details are set forth to provide a thorough understanding of the invention. However, it will be apparent to those skilled in the art that the invention, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the invention.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

1. Overview

Systems, methods, apparatuses, and computer program products are provided to enable adaptive scanning for a communications network. Current scanning systems fail to take into account changing conditions that may make scanning for a network or a network access point advisable or inadvisable at any given time. Accordingly, methods, systems, and computer program products are provided for adaptive scanning for communications networks.

In an embodiment, a communications device (such as a mobile handset) is configured to scan for a network or a network access point based on conditions detectable by the communications device. For example, data including user behavior, a status of the communications device, and/or signal status may be evaluated when determining whether to scan for a network or a network access point.

In an embodiment, the communications device is configured to evaluate the conditions detectable by the communications device and, based on an evaluation of the conditions, determine whether to scan for a network or a network access point. In one embodiment, the conditions are detected and evaluated by a combination of hardware and software installed on the communications device. In another embodiment, the communications device is configured to detect and/or evaluate conditions using hardware alone.

In an embodiment, the communications device is configured to send data including the conditions detectable by the communications device to a server accessible by a service provider. The system accessible by the service provider can then evaluate the conditions and determine whether the communications device should scan for a network or a network access point. The service provider may then send a message to the communications device based on the evaluation and/or the determination.

In an embodiment, the communications device modifies a time interval used for periodic scanning based on the evaluated conditions and the determination regarding whether to scan for a network. For example, if the communications device is currently inactive, the time interval used for periodic scanning may be decreased, causing the communications device to search for a communications network or access point less often.

In an embodiment, the communications device immediately scans for a network or a network access point based on the evaluated conditions and the determination. For example, if the communications device detects that the user is trying to access email and the communications device is either not connected to a network or has limited connectivity, the communications device can immediately search for a network to which it can connect.

2. Network

Network structure and communications according to an embodiment will now be described with reference to FIG. 1 and FIG. 2. In FIG. 1, a communications device 100 can connect 102 to a service provider network 104 through a service provider network access point 106 and can connect 108 to a visited network 110 through a visited network access point 112. As an example, a user of communications device 100 is a subscriber of a WiFi service. Thus, service provider network 104 is a WiFi network, and access point 106 is a WiFi access point, such as a wireless router.

If no WiFi access point 106 of a sufficient signal strength is available, the communications device 100 can connect to visited network 110 through a visited network, access point 112. In an embodiment, visited network 110 is a GSM network, and visited network access point 112 is a cell tower. GSM network 110 communicates with WiFi service provider network 104 by sending information over the public internet 114, and WiFi service provider network 104 communicates with the visited GSM network 110 by sending information over the Public Switched Telephone Network (PSTN) 116.

3. Conditions Detectable by the Communications Device

The communications device may detect several conditions used to make a determination regarding whether to scan for a communications network or access point. In an embodiment, these conditions include user behavior, communications device status, and signal status. It should be understood that embodiments of the invention described herein are combinable with the teachings and disclosure of U.S. Provisional Application No. 61/364,733, filed on Jul. 15, 2010, which is incorporated by reference above in its entirety.

3.1 User Behavior

In an embodiment, user behavior may be evaluated to determine whether to scan for a network. For example, a communications device may scan less frequently if the communications device is idle and more frequently if the communications device is currently being used.

In another embodiment, a communications device may determine to scan for communications networks and access points less frequently if the user is currently using the communications device to make a telephone call. For example, if the user is connected to a WiFi network and is currently making a telephone call, it may be unnecessary to scan for additional WiFi networks, as connecting to a different WiFi network may interrupt the call in progress. If, however, the user is connected to a GSM network and is currently making a telephone call and the GSM signal becomes very weak, the communications device may determine to scan more frequently for communications networks and access points, as initiating a handover to an alternate GSM network access point may not interrupt the call in progress.

Additionally, it may be determined that the communications device should scan more or less frequently based on a specific detected user behavior. In an embodiment, each user behavior is associated with a corresponding time interval. For example, if a user is accessing the internet using the communications device, a short time interval may be set, causing the communications device to scan for a communications network or access point more frequently, while a detected use of the communications to play a game loaded onto the communications device may not necessitate scanning as frequently. However, it should be understood that several different user behaviors may be monitored and evaluated when making a determination whether to scan for a network.

3.2 Communications Device Status

In an embodiment, a status of the communications device may be evaluated to determine whether to scan for a network. For example, to preserve battery life, a communications device may scan more frequently if the communications device is at full battery power than if the communications device is low on power.

Further, it may be determined that the communications device should scan more or less frequently based on a specific detected communications device status. In an embodiment, each communications device status is associated with a corresponding time interval or time interval modifier. For example, in an embodiment, a communications device that is put into standby mode is set to scan for a network every 4 minutes, and a communications device that is not in standby mode is set to scan for a network every 2 minutes. In another embodiment, a time interval modifier is applied to a communications device once it goes into standby mode. For example, if a communications device is set to scan for a network every 2 minutes, once the communications device goes into standby mode, a modifier of +2 minutes is applied to the scanning interval of the communications device so that it is now configured to scan for a network every 4 minutes.

In an embodiment, different time intervals are associated with different levels of battery power. For example, a communications device that it at 10% battery power may be associated with a relatively long time interval, causing the communications device to scan infrequently, while a communications device that is at 60% battery power may be associated with a shorter time interval. However, it should be understood that several different statuses of the communications device may be monitored and evaluated when making a determination whether to scan for a network.

3.3 Signal Status

In an embodiment, signal status may be evaluated to determine whether to scan for a network. For example, a communications device may scan less frequently if the communications device has a strong connection to a network and more frequently if the communications device has a weak connection to the network. Additionally, different levels of connectivity may be associated with corresponding time intervals. For example, a communications device detecting a strong signal from a network may be associated with a relatively long time interval, causing the communications device to scan infrequently, while a communications device detecting a weak signal from a network may be associated with a relatively short time interval.

Further, in some embodiments, the communications device may determine to scan for communications networks or access points more or less frequently based on the type of network (e.g., GSM or WiFi) that the communications device is connected to. For example, if the communications device is currently connected to a GSM network and receives service from a WiFi service provider at a cheaper rate than that charged by the GSM network provider, the communications device may determine to scan for available networks more frequently. Conversely, if the communications device is connected to a WiFi network, and the WiFi service provider charges at a cheap rate, the communications device may determine to scan for available communications networks and access points less frequently.

In an embodiment, each network is associated with a connection cost, and the communications device evaluates this connection cost when determining how frequently it should scan for additional networks. For example, if a communications device is roaming on a relatively expensive GSM network, it can be configured to scan for additional networks more frequently that it would while roaming on a less expensive GSM network.

4. Time Interval

In an embodiment, the communications device modifies a current time interval used for periodic scanning based on the evaluated conditions and the determination regarding whether to scan for a network. For example, a communications device in standby mode may be associated with a first time interval, and, when the communications device returns to active mode, this change in mode may be detected, and a determination may be made to shorten the time interval, causing the communications device to scan for a communications network or access point more frequently.

In an embodiment, time intervals are set in discrete units. For example, in an embodiment, a communications device may be configured to scan for a network or a network access point every 1 minute, 2 minutes, or 5 minutes depending on the evaluated conditions. In another embodiment, time intervals may be set to any number and may be calculated based on an algorithm taking into consideration several different conditions.

For example, a first time interval set to one minute and twenty-two seconds may be the result of a calculation taking into consideration factors including a strong signal, the communication device being in active mode, the battery power being high, and the communication device not currently being used. If the communication device then switches to standby mode, a new calculation may be performed, taking the switch to standby mode into consideration, and a second time interval of, for example, two minutes and eleven seconds, may result.

Further, some factors may be assigned a larger weight than other factors when determining a new time interval. For example, a weak signal may be considered a more important factor than whether the device is currently in use, and a change in the signal strength may have more of an impact on a new determined time interval than a change in the usage of the device.

Additionally, some factors may be assigned to a certain time interval regardless of the status of other factors. For example, if the communications device has 2% battery life, the time interval may be set to 10 minutes regardless of other factors.

FIGS. 2A and 2B depict an exemplary embodiment of determining a time interval based on a detected change in condition. FIG. 2A shows a communications device 200 that scans 202 for communications networks or access points 204 every 2 minutes 206.

In FIG. 2B, the communications device 208 detects a change in condition and/or status of the communications device 210 and, in response to the detected change of condition, determines a new time interval 212 to scan for networks. For example, the communications device 208 may detect that it is receiving a weak signal from the network 214 it is connected to, and, in response to this detection, the communications device 208 may determine that it should scan for other communications networks or access points more often. Scanning more often may result in faster detection of another communications network, or access point 216.

In an embodiment, this change in condition is detected during a periodic communications device status check. For example, the communications device can be configured to periodically check the status of a set of conditions and modify a time interval when the communications device detects a change in condition. In an embodiment, the time interval of this periodic status check can also be changed and/or configured (e.g., by a user of the communications device and/or by a service provider).

In an embodiment, some conditions and/or changes in condition can trigger an immediate scan for a new network. For example, in an embodiment, if the signal strength of a communications device crosses a threshold (e.g., defined by the service provider or manufacturer) into a "weak" signal strength range, an immediate scan is triggered. In another embodiment, once the battery level of a communications device comes out of a standby mode, the communications device can initiate an immediate scan for a new network. In an embodiment, this immediate scan is initiated in addition to changing the scanning time interval associated with the detected change in condition and/or change in status of the communications device. In an embodiment, if a new network is detected by the immediate scan, the scanning time interval of the communications device is not changed.

It should be understood that standby mode as described by embodiments of the invention discussed herein can encompass a variety of types of standby modes. For example, in an embodiment, standby mode is a "sleep" mode, and a communications device in standby mode is put into a state having lower power and/or reduced functionality when compared to a communications device in an active mode. In another embodiment, standby mode is an active mode entered into by a communications device when the communications device has no active voice connection. In this embodiment, a communications device in standby mode does not necessarily have reduced functionality and is not necessarily put into a lower power state than a communications device that has an active voice connection.

5. Procedure

Figure 3:
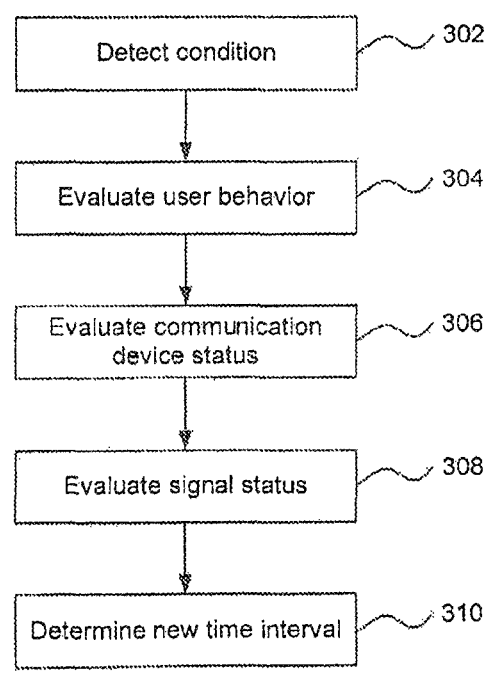
FIG. 3 depicts an procedure that may be used to determine a time interval specifying how often a scan for communications networks or communications network access points should be performed in accordance with an embodiment of the present invention.

FIG. 3 depicts an exemplary procedure 300 that may be used to determine a time interval specifying how often a scan for communications networks or communications network access points should be performed in accordance with once embodiment. First, a condition may be detected 302. In an embodiment, this condition may include a change in user behavior, communication device status, or signal status. After the condition is detected 302, current user behavior 304, communications device status 306, and signal status 308 may be evaluated. This evaluation may occur at the communications device or at a server accessible by the service provider. Finally, a new time interval 310, responsive to the change in condition detected by the communication device 302, is determined based on the evaluated user behavior 304, communications device status 306, and signal status 308. It should be noted that several algorithms are possible for calculating a new time interval. For example, in an embodiment, each factor may be assigned a weight, and the new time interval may be determined using a weighted average of the factors.

6. Example

FIG. 4 depicts a series of time interval changes responsive to a series of detected conditions in accordance with an embodiment. In FIG. 4, a chart 400 of conditions detected 402 by a communications device, user behavior 404, communications device status 406, signal status 410, and time intervals 412 is shown.

Initially 414, the communication device is not in use, is in standby mode, has a high battery life, has a strong connection to a communications network, and scans for communications networks and access points every two minutes.

When a switch to active mode is detected 416, a new time interval is calculated based on the detected change of condition. A new time interval of 1 minute is calculated, responsive to the change from standby mode to active mode and the fact that the communications device is now in use. The new time interval of 1 minute causes the communications device to scan for communications networks and access points each minute, instead of once every two minutes.

It should be noted that several algorithms are possible for calculating a new time interval. For example, in an embodiment, each change in status is associated with a time interval modifier. For example, in an embodiment a change from a strong signal to a weak signal can be assigned a time interval modifier of −1 minute (e.g., once the communications device detects a weak signal, it scans for a new network one minute more frequently than it would if it detected a strong signal). In another embodiment, each combination and/or permutation of communications device conditions and/or statuses is assigned a predetermined time interval in a status table. In either case, these time interval modifiers and/or status table(s) can be configured to be changed and/or updated (e.g., by a user of the communications device and/or a service provider).

When it is detected that the communications device is no longer in use 418, another time interval calculation is performed. In this case, the change in use may not be significant enough to result in a change of time interval (especially, for example, if a system using discrete time intervals is used). In this example 418, the time interval remains set at 1 minute.

When a weak signal is detected, a new time interval is calculated. In this example 420, the weak signal necessitates scanning for communications networks and access points more frequently, so the time interval is shortened to 0.5 minutes.

When the communications device detects that it has low battery life 422, another calculation may be performed. In this example 422, the time interval is set to 5 minutes to preserve battery power.

7. Conclusion

It is to be appreciated that the Detailed Description section, and not the Abstract section, is intended to be used to interpret the claims. The Abstract section may set forth one or more but not all exemplary embodiments of the present invention as contemplated by the inventor(s), and thus, is not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The above systems and methods may be implemented as a computer program executing on a machine, as a computer program product, or as a tangible and/or non transitory computer-readable medium having stored instructions. For example, the functions described herein could be embodied by computer program instructions that are executed by a computer processor or any one of the hardware devices listed above. The computer program instructions cause the processor to perform the signal processing functions described herein. The computer program instructions (e.g. software) can be stored in a tangible non transitory computer usable medium, computer program medium, or any storage medium that can be accessed by a computer or processor. Such media include a memory device such as a RAM or ROM, or other type of computer storage medium such as a computer disk or CD ROM. Accordingly, any tangible non-transitory computer storage medium having computer program code that cause a processor to perform the signal processing functions described herein are within the scope and spirit of the present invention.

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method for determining a time interval for scanning for a communications network, the method comprising:
    setting, by a server accessible by a service provider from a communications device, a first time interval in accordance with a first time interval modifier associated with a first value of a first condition of the communications device;
    detecting, by the server, a change in a status of the communications device from the first value of the first condition to a second value of the first condition;
    adjusting, by the server, the first time interval by a second time interval modifier associated with the second value of the first condition to provide a second time interval; and
    sending, by the server to the communications device, the second time interval to the communications device.

2. The method of claim 1, wherein the first condition comprises:
    a user behavior;
    a communications device status; or
    a signal status.

3. The method of claim 1, wherein the adjusting comprises:
    increasing the first time interval by the second time interval modifier when the second value of the first condition represents an improvement over the first value of the first condition.

4. The method of claim 1, wherein the adjusting comprises:
    decreasing the first time interval by the second time interval modifier when the second value of the first condition represents a deterioration of the first value of the first condition.

5. The method of claim 1, further comprising:
    retrieving the first time interval modifier and the second time interval modifier from a status table, the status table including a plurality of time interval modifiers corresponding to a plurality of values for a plurality of conditions of the communications device.

6. The method of claim 1, further comprising:
    triggering an immediate scan for the communications network when the second value of the first condition crosses a threshold.

7. The method of claim 1, wherein the setting comprises:
    setting the first time interval corresponding to the first time interval modifier and a third time interval modifier in accordance with a third value of a second condition of the communications device; and
    wherein the detecting comprises:
        detecting the change in the status of the communications device from the first value of the first condition to the second value of the first condition and no change in the third value of the second condition.

8. A server accessible by a service provider, the server comprising:
    a memory configured to store a plurality of time interval modifiers corresponding to a plurality of conditions of a communications device; and
    a processor configured to:
        set a first time interval in accordance with a first time interval modifier from among the plurality of time interval modifiers associated with a first value of a first condition from among the plurality of conditions,
        detect a change in a status of the communications device from the first value of the first condition to a second value of the first condition;
        adjust the first time interval by a second time interval modifier associated with the second value of the first condition to provide a second time interval; and send the second time interval to the communications device.

9. The server of claim 8, wherein the first condition comprises:
- a user behavior;
- a communications device status; or
- a signal status.

10. The server of claim 8, wherein the processor is configured to increase the first time interval by the second time interval modifier when the second value of the first condition represents an improvement over the first value of the first condition.

11. The server of claim 8, wherein the processor is configured to decrease the first time interval by the second time interval modifier when the second value of the first condition represents a deterioration of the first value of the first condition.

12. The server of claim 8, wherein the processor is further configured to retrieve the first time interval modifier and the second time interval modifier from a status table, the status table including the plurality of time interval modifiers corresponding to a plurality of values for the plurality of conditions of the communications device.

13. The server of claim 8, wherein the processor is further configured to trigger an immediate scan for a communications network when the second value of the first condition crosses a threshold.

14. The server of claim 8, wherein the processor is configured to:
- set the first time interval corresponding to the first time interval modifier and a third time interval modifier in accordance with a third value of a second condition of the communications device, and
- detect the change in the status of the communications device from the first value of the first condition to the second value of the first condition and no change in the third value of the second condition.

15. A server accessible by a service provider, the server comprising:
- a memory configured to store a plurality of time interval modifiers corresponding to a plurality of conditions of a communications device; and
- a processor configured to:
  - set a first time interval in accordance with a first time interval modifier from among the plurality of time interval modifiers associated with a first plurality of values of a first plurality of conditions from among the plurality of conditions,
  - detect a change in a status of the communications device from the first plurality of values to a second plurality of values of the first plurality of conditions,
  - adjust the first time interval by a second time interval modifier associated with the second plurality of values of the first plurality of conditions to provide a second time interval, and
  - send the second time interval to the communications device.

16. The server of claim 15, wherein at least one of the first plurality of conditions comprises:
- a user behavior;
- a communications device status; or
- a signal status.

17. The server of claim 15, wherein the processor is configured to increase the first time interval by the second time interval modifier when the second plurality of values of the first plurality of conditions represents an improvement over the first plurality of values of the first plurality of conditions.

18. The server of claim 15, wherein the processor is configured to decrease the first time interval by the second time interval modifier when the second plurality of values of the first plurality of conditions represents a deterioration of the first plurality of values of the first plurality of conditions.

19. The server of claim 15, wherein the processor is further configured to retrieve the first time interval modifier and the second time interval modifier from a status table, the status table including the plurality of time interval modifiers corresponding to a plurality of values for the plurality of conditions of the communications device.

20. The server of claim 15, wherein the processor is further configured to trigger an immediate scan for a communications network when at least one of the second plurality of values of the first plurality of conditions crosses a threshold.

* * * * *

UNITED STATES PATENT AND TRADEMARK OFFICE
CERTIFICATE OF CORRECTION

PATENT NO. : 9,980,212 B1
APPLICATION NO. : 15/695430
DATED : May 22, 2018
INVENTOR(S) : Damenti et al.

It is certified that error appears in the above-identified patent and that said Letters Patent is hereby corrected as shown below:

On the Title Page

Replace "the term of this patent is extended or adjusted under 35 U.S.C. 154(b) by 0 days. days." with "the term of this patent is extended or adjusted under 35 U.S.C. 154(b) by 0 days."

Signed and Sealed this
Twenty-eighth Day of May, 2019

Andrei Iancu
*Director of the United States Patent and Trademark Office*